United States Patent [19]

Kizu et al.

[11] Patent Number: 5,251,047
[45] Date of Patent: Oct. 5, 1993

[54] APPARATUS INCLUDING A CIRCUIT FOR PROCESSING AN ANALOG IMAGE SIGNAL SUPPLIED FROM AN ARRAY SENSOR

[75] Inventors: Shuji Kizu, Kanagawa; Junichi Koseki; Jun Sakakibara, both of Tokyo, all of Japan

[73] Assignee: Kabushiki Kaisha Toshiba, Kanagawa, Japan

[21] Appl. No.: 748,879

[22] Filed: Aug. 23, 1991

[30] Foreign Application Priority Data

Aug. 24, 1990 [JP] Japan ................................. 2-221259

[51] Int. Cl.⁵ .............................................. H04N 3/14
[52] U.S. Cl. .................................. 358/471; 358/213.29
[58] Field of Search .................... 358/471, 482–483, 358/213.22, 213.29

[56] References Cited

U.S. PATENT DOCUMENTS

| | | | |
|---|---|---|---|
| 4,281,254 | 7/1981 | Seachman | 358/483 |
| 4,432,017 | 2/1984 | Stoffel et al. | 358/213.29 |
| 4,438,457 | 3/1984 | Tandon et al. | 358/213.29 |
| 4,665,440 | 5/1987 | Tromberg | 358/483 |
| 4,819,072 | 4/1989 | Boucharlat et al. | 358/213.29 |
| 4,878,119 | 10/1989 | Beikirch et al. | 358/471 |

Primary Examiner—Stephen Brinich
Attorney, Agent, or Firm—Finnegan, Henderson, Farabow, Garrett & Dunner

[57] ABSTRACT

An apparatus including an integrated circuit for processing analog image signals supplied from a CCD sensor. The integrated circuit has a photodiode line array between a pair of shift gates and a pair of CCD shift registers, in that order. The integrated circuit further includes logic that combines the respective output signals of the CCD shift registers as signals either in-phase or out-of-phase (in opposite phase) with respect to each other, and a selecting signal generating device to generate a signal that selects, or indicates the selected, one or the other of the two combinations.

8 Claims, 8 Drawing Sheets

| CONTROL SIGNAL | | | |
|---|---|---|---|
| 1 BIT ENABLING SIGNAL (103a) (106a) | Sg1 (103b) (106b) | Sg0 (103b) (106b) | ATTENUATION (dB) |
| 1 | — | — | 0 |
| 0 | 0 | 0 | 0 |
| 0 | 0 | 1 | 2 |
| 0 | 1 | 0 | 4 |
| 0 | 1 | 1 | 6 |

APPARATUS INCLUDING A CIRCUIT FOR PROCESSING AN ANALOG IMAGE SIGNAL SUPPLIED FROM AN ARRAY SENSOR

FIELD OF THE INVENTION

The present invention relates to an image reading apparatus, and more particularly, to an integrated circuit for use in the image reading apparatus such as a facsimile device, an image scanner etc., and converting analog outputs into digital data.

BACKGROUND OF THE INVENTION

Recently, a CCD sensor has been widely used as a photoelectric transducer in image reading apparatus such as facsimile, scanner, etc. This type of CCD sensor has been variously modified and large scale CCD sensors are available at present.

With increasing demands of high speed operation, high quality image and color image processing for image reading apparatuss, importance of the processing technique for signals output from CCD sensors has increased. To process such signals output from CCDs at a high level, exclusive use large scale integrated circuits (hereinafter refered to as LSIs) for exclusive use with the CCDs have been developed.

Further, high operation frequency and driving capacity are demanded for the construction of horizontal transfer registers of CCD sensors for HDTV (High Definition Television); and two-wire reading type CCD sensors having two horizontal transfer registers have become the leading products.

In this case, there are two systems for reading signals from CCD sensors, i.e., an opposite phase reading system and an in-phase reading system. In the opposite phase reading system, two channel signals output from two horizontal transfer registers are alternately read. In the in-phase reading system, the same number of transfer stages are provided in each of two horizontal transfer registers for reading signals in the in-phase state from start of the signal transfer to an output of the signal.

In the in-phase reading system, a conventional manner for obtaining a one-line output required to delay one channel signal by using an analog delay line, etc., and then to combine the delayed signal and the other channel signal together. While in the opposite-phase reading system, such a one-line output is obtained by directly combining two channel signals output from a CCD sensor together. This means that the in-phase reading system requires complicated signal processings in comparison to the opposite phase reading system for obtaining the one-line output. Therefore, the opposite-phase reading system was the leading system for CCD sensors heretofore.

In recent years, however, it is reported that the in-phase reading system is more effective than the opposite phase reading system from the viewpoint of circuit stability, resolution stability, etc. See "Comparison of In-Phase Reading System with Opposite Phase Reading System of Two-Wire Reading CCD for High Fidelity Television". 1990 Annual Congress of Institute of Television (ITEC '90).

Accordingly, in the case of LSIs adopted for processing output signals from CCD sensors, while a leading system for processing was so far for only output signals extracted from CCD sensors by the opposite phase reading system, it becomes also necessary to process signals extracted by the in-phase reading system; However, at the present, in order to process signals extracted by the in-phase reading system it is necessary to delay signals through one of the channels by the analog delay line, etc. as described above, because both signals from a CCD sensor through two channels are the same phase. This makes the external process complicated and lacks the general usability as LSI.

As described above, conventional integrated circuits are generally capable of processing only output signals extracted from photoelectric transducers (CCD sensors) by the opposite phase reading system; and if, it is intended to process output signals extracted by the in-phase reading system, the process will become complicated.

SUMMARY OF THE INVENTION

It is, therefore, an object of the present invention to provide an image reading apparatus which is able to cope with signals from photoelectric transducers in either cases where the signals are read by the opposite phase reading system or by the in-phase reading system.

Another object of the present invention is to provide an image reading apparatus which is also able to positively process signals with a simple circuit construction.

In order to achieve the above object, an image reading apparatus according to one aspect of the present invention includes apparatus for scanning an original image, including an array sensor between two horizontal transfer registers, and two reading systems each of which can generate an analog image signal by combining signals from the registers, the respective signals to be combined being in-phase in the one reading system and out-of-phase in the other reading system. Processing of the analog image signal involves responding to a selection of the use of a particular one of the reading systems to enable corresponding processing.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
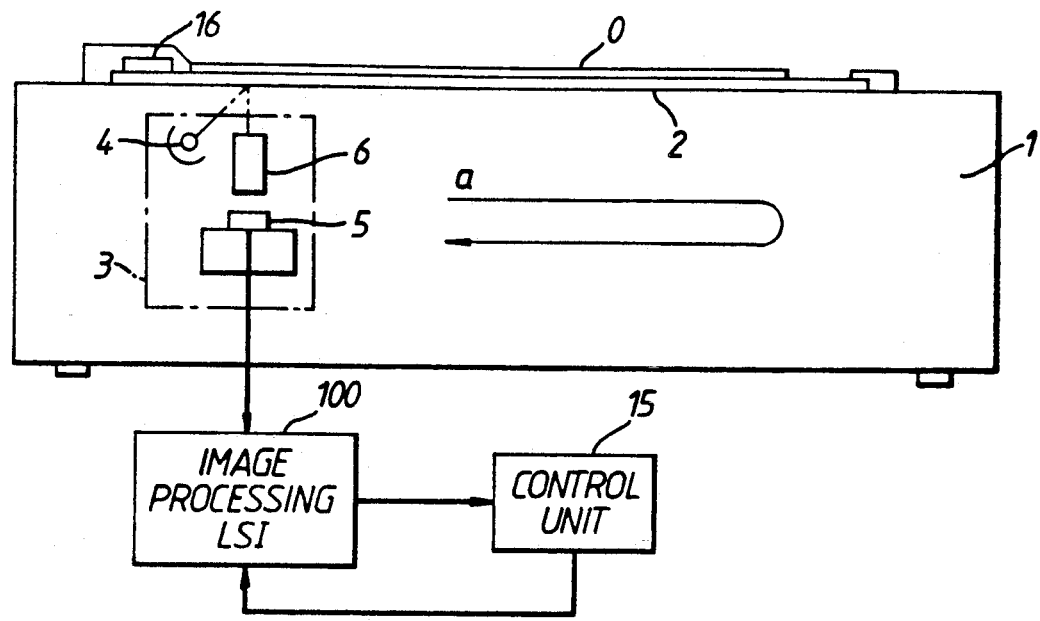
FIG. 1 is a block diagram showing the image reading apparatus.

The present invention will be described in detail with reference to the FIGS. 1 through 12. Throughout the drawings, like or equivalent reference numerals or letters will be used to designate like or equivalent elements for simplicity of explanation.

Figure 2:
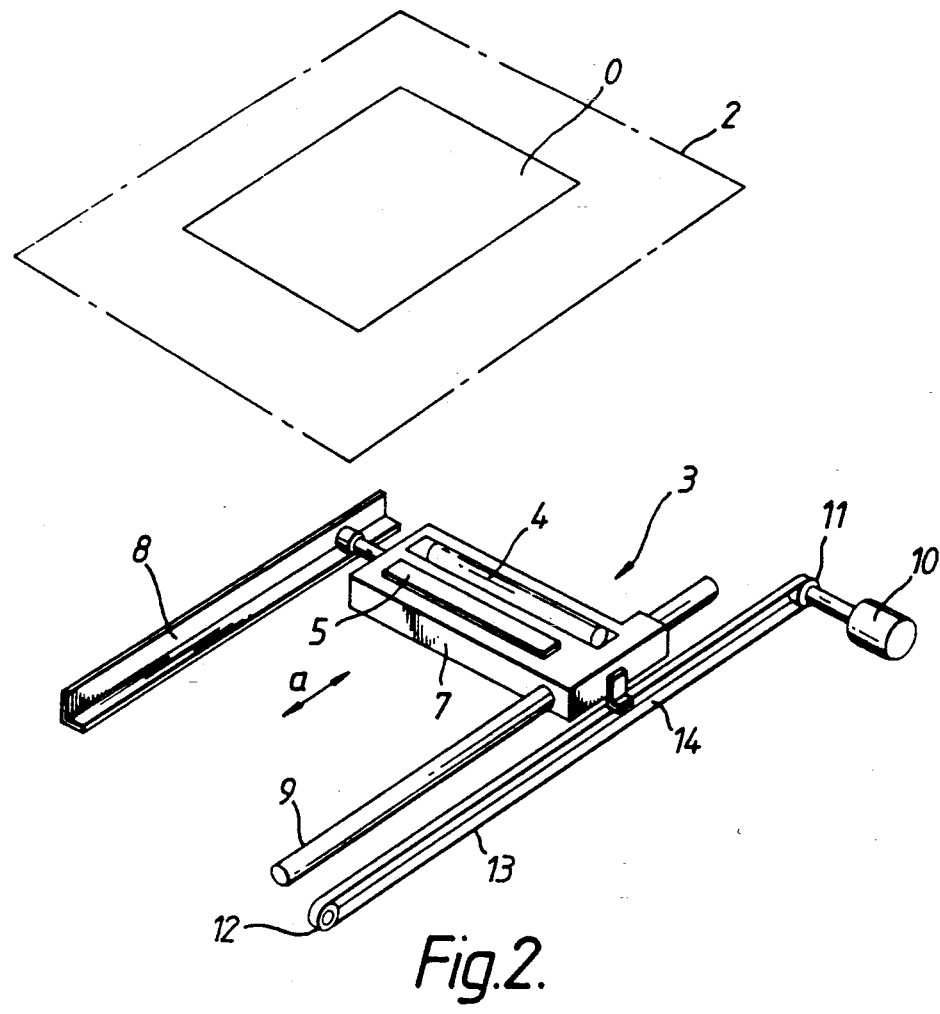
FIG. 2 is an oblique view showing the image reading apparatus.

An embodiment of the present invention is explained hereinafter referring to the attached drawings. FIGS. 1 and 2 show the construction of the image reading apparatus according to the present invention and a scanner has been used as the image reading apparatus in this case.

This scanner has a holder (referred to as document holder hereafter) 2 which consists of transparent glass (platen glass) fixed on the top of the scanner body 1 for holding a document on the scanner. A white reference plate 16 is provided near this document holder 2 and the scanning unit 3 is provided at the lower part of the document holder 2.

This scanning unit 3 moves in the direction of arrow "a" along the lower surface of the document holder 2 to optically scan a document O carrying a certain image which is placed on the document holder 2. The scanning unit 3 includes an illumination lamp, e.g., a fluorescent lamp 4 which applies light to the document O, a photoelectric transducer, e.g., a CCD line sensor 5 which receives reflected light from the document O, an optical system 6 such as a convergence lens which leads the reflecting light from one line area for reading the document O to the CCD line sensor 5 and a carriage 7 which movably supports these components of the scanning unit 3.

The CCD line sensor 5 generates an image signal of the document O in the form of an electric signal by photoelectrically converting the reflected light from the document O.

The carriage 7 can freely reciprocate in the direction of an arrow "a" in the drawing guided by a guide rail 8 and a guide rod 9. The carriage 7 is driven by a belt drive system which comprises a reversible scanning motor, e.g., a stepping motor 10, a motor pulley 11 mounted on a shaft of the stepping motor 10, a timing belt 13 suspended between the motor pulley 11 and a follower pulley 12 along the guide rod 9. The carriage 7 is fixed to the endless belt 13 via a fixing member 14.

Further, the scanner body 1 houses a control unit 15 and an image processing integrated circuit (referred to as image processing LSI hereafter) 100.

The image processing LSI 100 serves to convert an output signal (analog signal) from the CCD line sensor 5 to a digital data and to output the converted digital data. The details of the image processing LSI 100, e.g., its construction will be explained later.

The control unit 15, consisting of a central processing unit (CPU), etc., serves to control the image processing LSI 100, as well as to direct the scanner unit 3 along a lateral scanning (main scanning) line and along a vertical scanning (subscanning) line, i.e., a physical scanning movement in the vertical direction of the document holder 2 and an electrical scanning along the the CCD line sensor 5.

Figure 3:
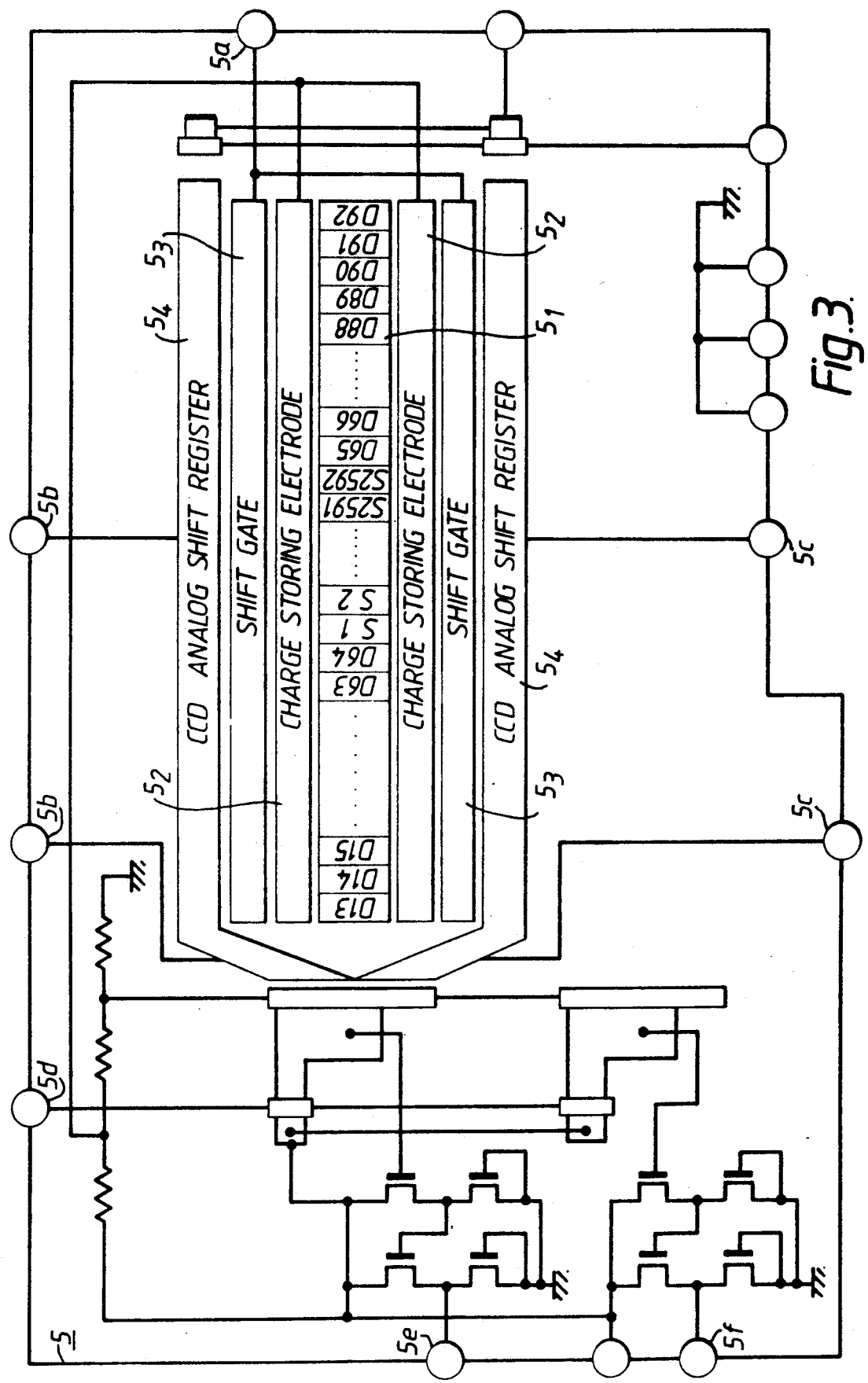
FIG. 3 is a block diagram showing the outline of the photoelectric transducer.

Referring now to FIG. 3, the construction of the CCD line sensor 5 will be explained in detail.

The CCD line sensor 5 is constructed in a form of integrated circuit chip which includes mainly a photodiode array 51, a pair of charge storing electrodes 52, 52 and a pair of shift gates 53, 53, a pair of CCD analog shift registers 54, 54 and other peripheral electric circuits.

The photodiode array 51 comprises an array of photodiodes. The photodiodes are divided in three sets, i.e., a first set of photodiodes D13 to D64, a second set of photodiodes S1 to S2592 and a third set of photodiodes D65 to D92.

The second array of photodiodes S1 to S2592 is provided on the central region of the photodiode array 51 for actually reading image signals. The first array of photodiodes D13 to D64 on one end of the photodiode array 51 and the third array photodiodes D65 to D93 on the other side of the photodiode array 51 are provided as dummy members.

The overall length of the second array of the photodiodes S1 to S2592 is physically shorter than the lateral dimension, i.e., the main scanning range of the document holder 2, but the optical system is designed to cause the first array of the photodiodes S1 to S2592 substantially correspond to the main scanning range. A part of the first array of the photodiodes D13 to D64, i.e., the photodiodes D13 to D29 are covered by an aluminum film. This aluminum film is coated by, e.g., an evaporation on the photodiodes D13 to D29 for masking the light applied to them so that reference bit data are obtained based on outputs of the photodiodes D13 to D29. The reference bit data are used as a black pixel reference voltage in processing a sensor output of the photodiode array 51, i.e., the image signals output from the second array of the photodiodes S1 to S2592.

The charge storing electrodes 52, 52, the shift gates 53, 53, the CCD analog shift registers 54, 54 are located on the opposite sides of the photodiode array 51. In addition, the other peripheral electric circuits provide required parts, such as an input interface, an output interface, a power supply etc., and wirings for coupling them in the CCD line sensor 5.

Figure 4:
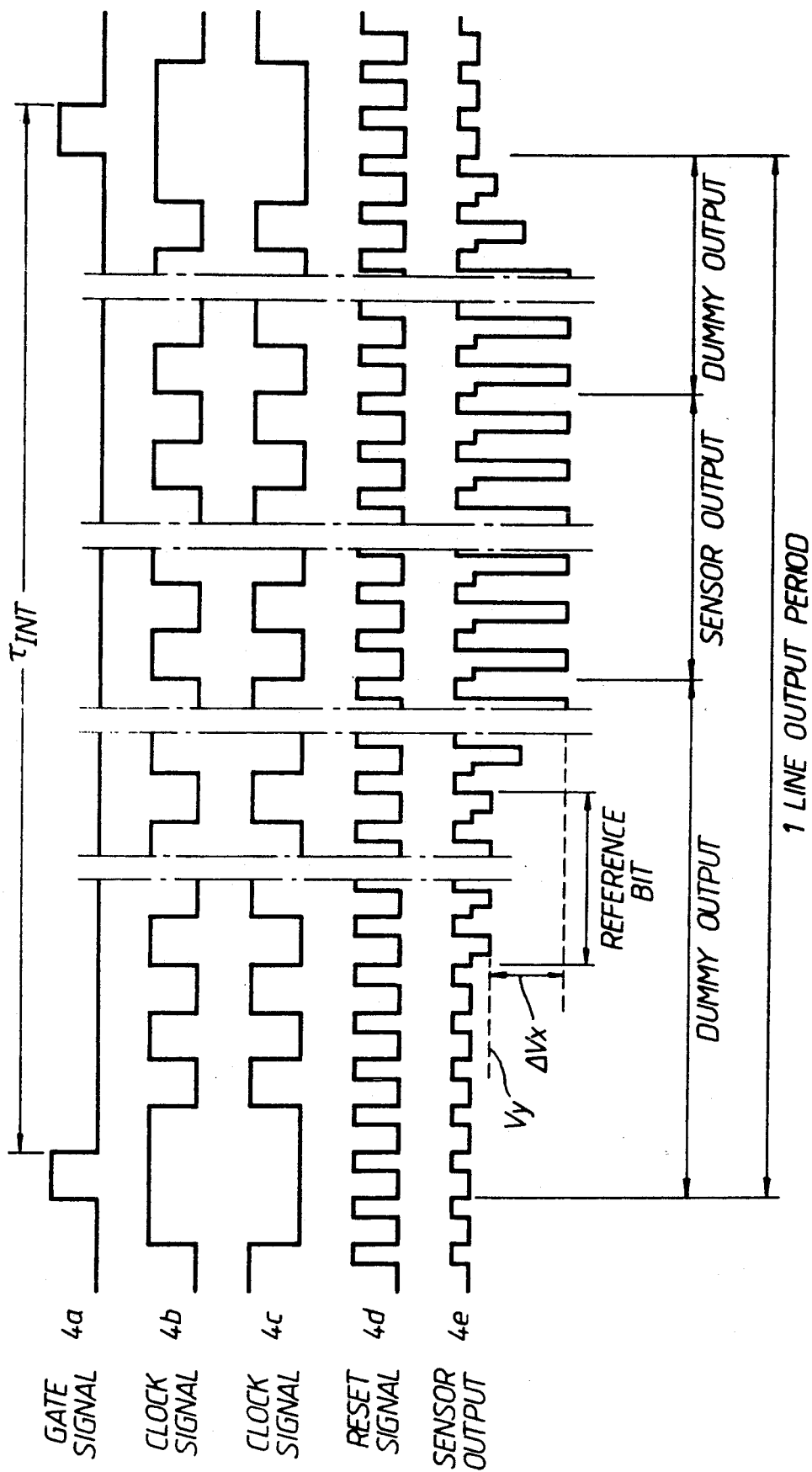
FIGS. 4a-4e are diagrams showing signal waveforms at various parts of the photoelectric transducer.

Referring now to FIG. 4, the operation of the CCD line sensor 5 will be explained in detail. FIG. 4 shows a timing chart of signals at various parts of the CCD line sensor 5.

A gate signal 4a as shown in FIG. 4(a) is applied to the shift gates 53 and 53. The pulse period $\tau$INT of the gate signal 4a is selected to secure an image signal storing period of the CCD line sensor 5. Further, clock signals 4b and 4c as shown in FIGS. 4(b) and 4(c) are applied to the CCD analog shift resisters 54 and 54 for clocking the operations of these registers.

A reset signal 4d as shown in FIG. 4(d) is applied to the output gate to initialize voltage of a floating capacitor at the output stage so that the sensor output can properly cope with pixel data transferred from the shift registers 54 and 54. Pulses of the clock signals 4b and 4c of the CCD analog shift registers 54 and 54 and the reset signal 4d are assigned time sequences corresponding to each of the photodiodes of the photodiode array 51.

A sensor output 4e as shown in FIG. 4(e) is output from the CCD line sensor 5. The output voltage Vy obtained by the photodiodes D13 to D29 covered with the aluminum film provides a dark reference voltage of the sensor output 4e. This sensor output 4e varies in response to a quantity of light applied to each of the photodiodes S1 to S2592. An error voltage ΔVx which is an amount of sensor output exceeding the dark reference voltage Vy provides an effective pixel data of each of the photodiodes S1 to S2592.

When the in-phase reading system is intended, single output of such sensor output 4e is derived from the CCD line sensor 5 through the terminal denoted by 5e (see FIG. 3). While, when the opposite phase reading system is intended, dual sensor outputs are derived through the terminals denoted by 5e and 5f (see FIG. 3).

Figure 5A:
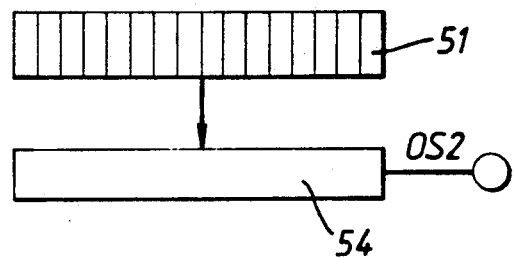
FIGS. 5a-5b are diagrams for illustrating the output modes of the photoelectric transducer.
Figure 5B:
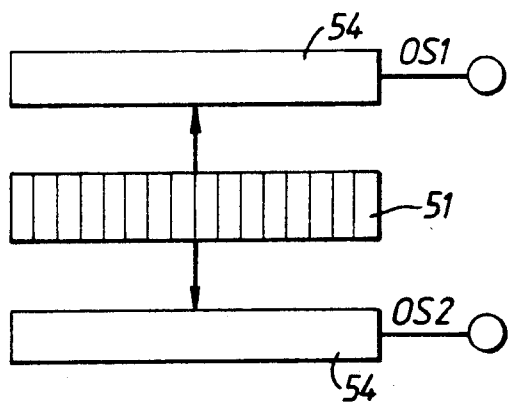
Figure 6:
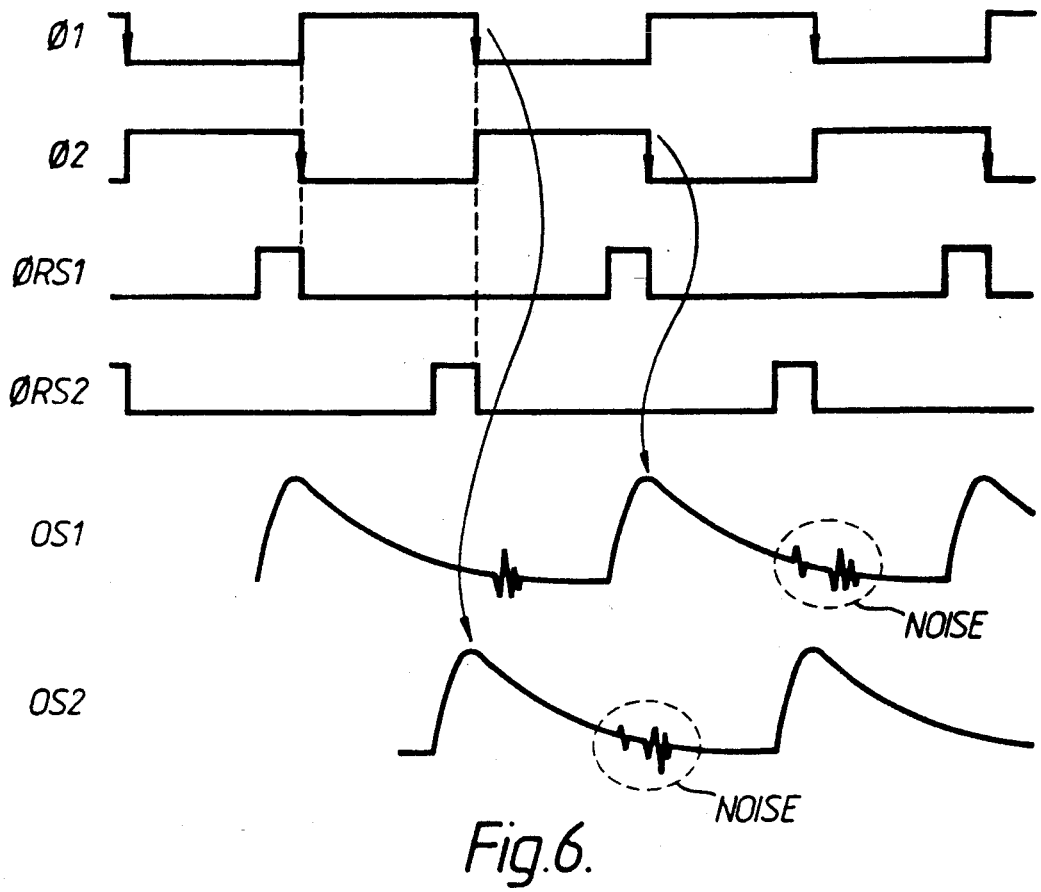
FIG. 6 is a timing chart of signals when reading signals from the photoelectric transducer by the opposite phase reading system.
Figure 7:
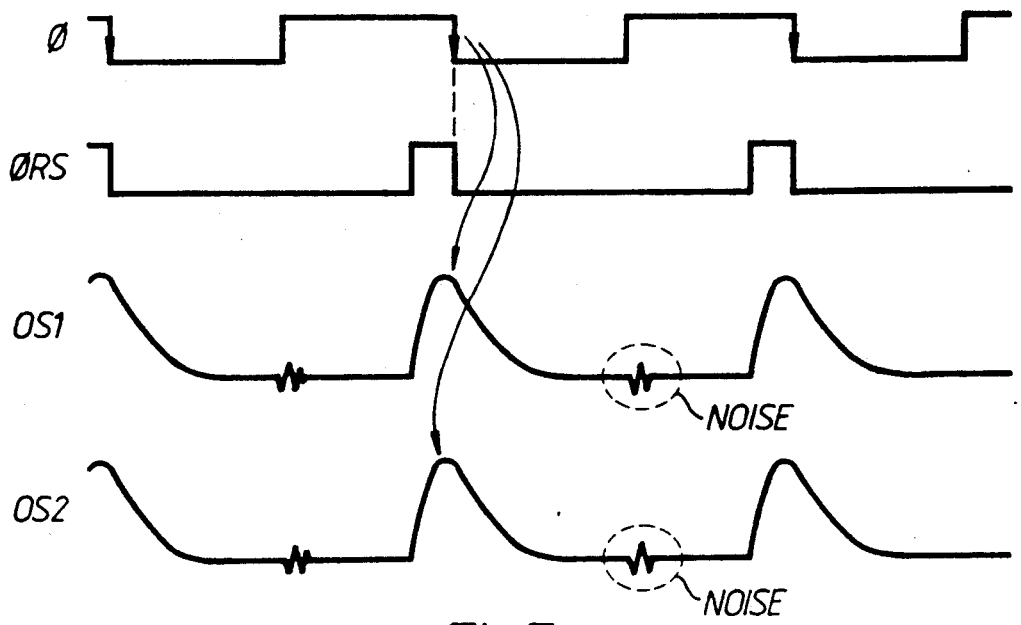
FIGS. 7 and 8 are timing charts of signals when reading signal from the photoelectric transducer by the in-phase reading system.

Referring now to FIG. 5, two types of sensor outputs of the CCD sensor will be explained in brief. In FIG. 5(a) a single output of electric charge is generated from the photodiode array 51 so that the single output of electric charge is output through only one CCD analog shift register 54. In FIG. 5(b) dual outputs of electric charges are generated in the photodiode array 51 so that the dual outputs of electric charges are output through two CCD analog shift registers 54, 54. In the case of the dual output type CCD sensor, there are available two types of signal reading techniques, the opposite phase reading system as shown in FIG. 6 and the in-phase reading system as shown in FIG. 7. FIGS. 6 and 7 show the timing charts of signals in these two systems.

In the opposite phase reading system of FIG. 6, the dual sensor outputs OS1 and OS2 are alternately read in opposite phase as shown in the timing chart with reset pulses ϕRS1 and ϕRS2 which are shifted by 180° to each other. On the other hand, in the in-phase reading system of FIG. 7, the dual sensor outputs OS1 and OS2 are read out in-phase with each other as shown in this timing chart with single reset pulse ϕRS.

In the opposite phase reading system, the reset pulses for one of the outputs, e.g., OS1, appear in the middle way of the one period of the other output OS2, and vice versa. Thus, each output is deteriorated its relatively significant portion by noises originated from the reset pulses for The other output, as shown in FIG. 6.

Figures 8, 10:
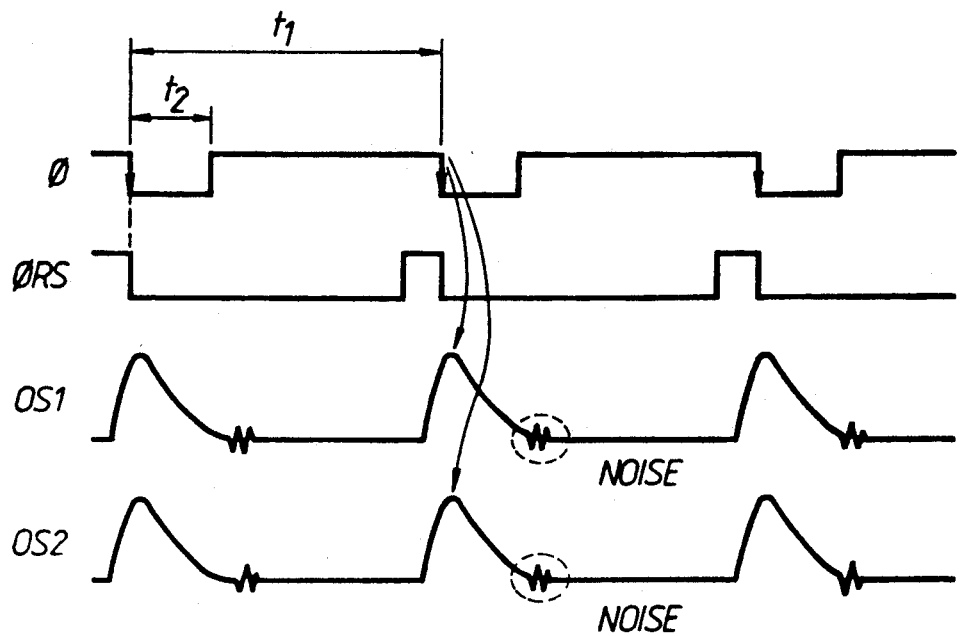
FIG. 10 is a diagram for illustrating the relationship between control signal and attenuation.

In the in-phase reading system, noises originated from clock pulses ϕ also appear in the output OS1 and OS2 but they do not injure the significant portions of the waveforms, as shown in FIG. 7. This becomes more effective by delaying the noise timing to the rear portion of the output period. For example, the noise timing can be delayed by reducing the duty ratio d of the clock pulses ϕ lower than 0.5, as shown in FIG. 8.

Figure 9:
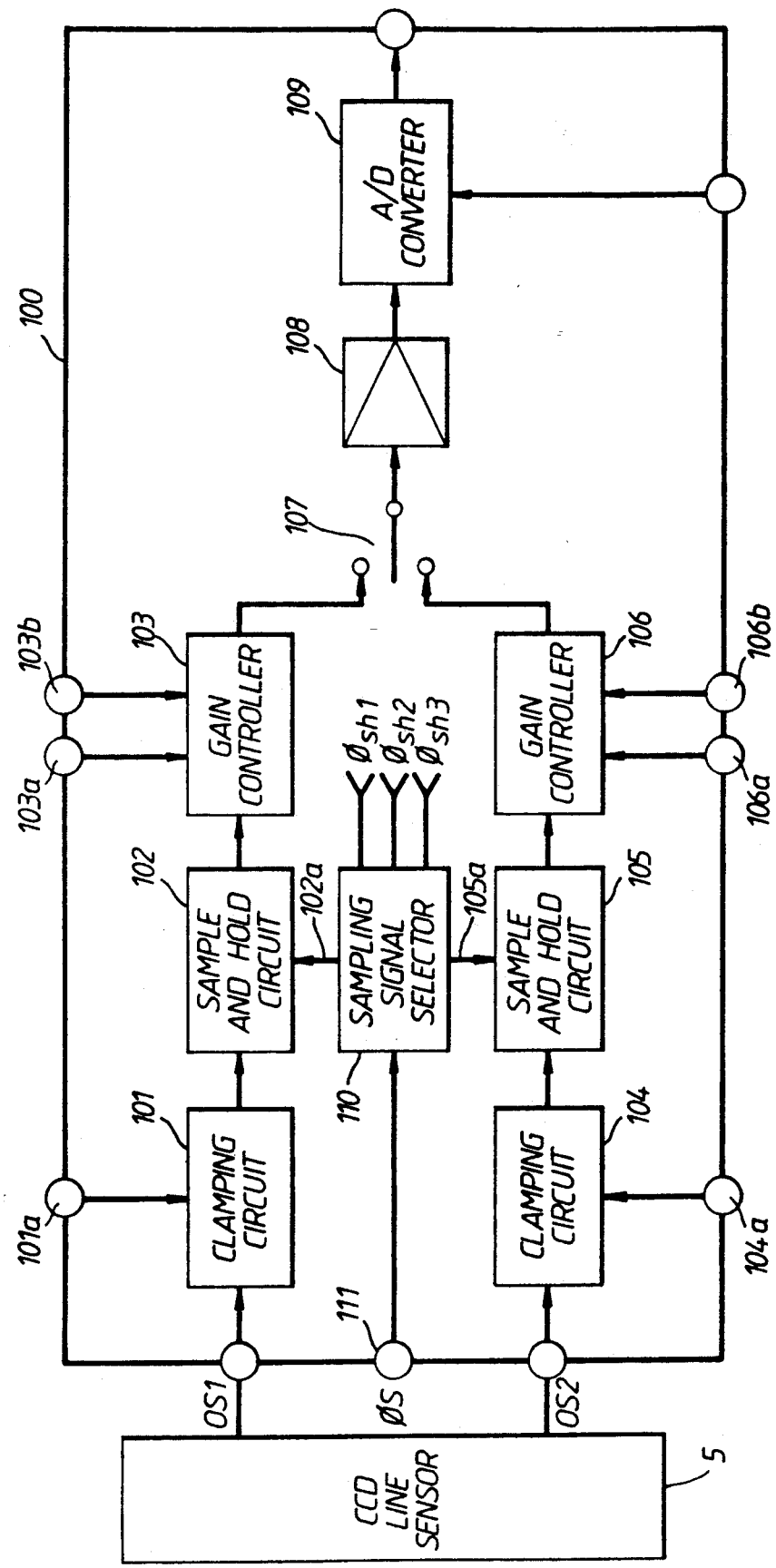
FIG. 9 is a block diagram showing the construction of the image reading apparatus according to the present invention.

Referring now to FIG. 9, the construction of the image processing LSI 100 which can be adapted for both the opposite phase reading system and the in-phase reading system will be explained in more detail. FIG. 9 shows a block diagram of the image processing LSI 100 coupled to the CCD line sensor 5.

This image processing LSI 100 comprises a pair of clamping circuits 101 and 104, a pair of sample-and-hold circuits 102 and 105, a pair of gain controllers 103 and 106, a switch 107, an amplifying device such as a buffer amplifier 108, an analog digital converter (A/D converter) 109 and a sampling signal selector 110. Further, the image processing LSI 100 is coupled to the control unit 15 (see FIG. 1) through terminals 101a, 103a, 103b, 104a, 106a, 106b and 111 for receiving a variety of timing signals or control signals.

The clamping circuits 101 and 104 are coupled to the sensor outputs OS1 and OS2 of the CCD line sensor 5 for clamping the dark reference voltage Vy to a predetermined level. The operation period of the clamping circuits 101 and 104 is controlled by timing signals on the terminals 101a and 104a to the reference bit period. The sample-and-hold circuits 102 and 105 carry out a sample-and-hold operation for the clamped levels output from the clamping circuits 101 and 104. The gain control circuits 103 and 106 suitably adjust the gains of the outputs from the sample-and-hold circuits 102 and 105, respectively under the controls of the control signals on the terminals 103a and 103b, 106a and 106b. These gain controls are carried out for preventing mulfunctions of the image processing LSI 100 due to excessive levels of the sensor output OS1 and OS2 applied from the CCD line sensor 5. That is, as an amplification factor of the amplifier 108 is fixed, if the analog sensor outputs OS1 and OS2 from the CCD line sensor 5 are too large, the amplified output of the amplifier may possibly exceed the reference voltage of the A/D converter 109 so that the operation of the image processing LSI 100 will be deteriorated.

The switch 107 causes the the pair of gain control circuits 103 and 106 to be alternately connected to the buffer amplifier 108 for combining their outputs together when the sensor outputs OS1 and OS2 are related to the opposite phase reading system. While, the switch 107 is fixed to always couple both the gain control circuits 103 and 106 to the buffer amplifier 108 when the sensor outputs OS1 and OS2 are related to the in-phase reading system.

FIG. 10 shows a table illustrating the relation between control signals and attenuations in the gain control circuits 103 and 106.

Here, 1 bit is assigned to an enabling signal on the terminals 103a and 106a; while 2 bits, i.e., Sg1 and Sg0 are assigned to the enabling signal on the terminals 103b and 106b. Thus, if the 1 bit enabling signal on the terminals 103a and 106a is "1", an attenuation of 0 dB will be effective in the gain control circuits 103 and 106 irrespective of the status of the 2 bit signals Sg1 and Sg0.

When all of the 1 bit enabling signal and the 2 bit signals Sg1 and Sg0 signals are "0", the attenuation of 0 dB will also be effective in the gain control circuits 103 and 106.

When the 1 bit enabling signal is "0" and the 2 bit signals Sg1 and Sg0 are "0" and "1", an attenuation will be effective in the gain control circuits 103 and 106. When the 1 bit enabling signal is "0" and the 2 bit signals Sg1 and Sg0 are "1" and "0", an attenuation of 4 dB will be effective in the gain control circuits 103 and 106. When 1 bit enabling signal is "0" and the 2 bit signals Sg1 and Sg0 are "1" and "1", an attenuation of 6 dB will be effective in the gain control circuits 103 and 106.

It becomes possible to more precisely control or to effect more deep attenuations by increasing the number of signals Sgn (n=1, 2 . . . ).

Referring back to FIG. 9, the operation of the sampling signal selector 110 will be described in detail. This sampling signal selector 110 is applied with a mode switching signal ϕs from the control unit 15 (see FIG. 1) through the terminal 111. The mode switching signal ϕs changes its state in response to whether the reading system of the CCD line sensor 5 is the opposite phase reading system or the in-phase reading system. Then the sampling signal selector 110 selectively passes a set of timing pulse signals such as sampling pulse signals ϕsh1 and ϕsh2 or a single timing pulse signal such as a sampling pulse signal ϕsh3 which are generated from the control unit 15 (see FIG. 1) to the sample-and-hold circuits 102 and 105 through leads 102a and 105a in response to the mode switching signal φs.

The sampling pulse signals φsh1 and φsh2 are separately applied to the sample-and-hold circuits 102 and 105, when the sensor outputs OS1 and OS2 are generated according to the opposite phase reading system. The sampling pulse signal φsh3 is applied to both of the sample-and-hold circuits 102 and 105 through the leads 102a and 105a when the sensor outputs OS1 and OS2 are generated according to the in-phase reading system. In the former case, the switch 107 alternately couples the sample-and-hold circuits 102 and 105 to the buffer amplifier 108, as mentioned above. In the latter case, the switch 107 is fixed to always couple the sample-and-hold circuits 102 and 105 to the buffer amplifier 108, as also mentioned above.

Now the operation of the embodiment as described above will be explained.

First, the scanning unit 3 moves to the white reference plate 16 and the illumination lamp 4 is turned on. Then, the reflected light from the white reference plate 16 is converged on the CCD line sensor 5 via the optical system 6. As a result, the sensor output 5e (5f) is output from the CCD line sensor 5. The sensor output 5e (5f) is then applied to the image signal processing LSI 100 as an analog signal.

In the image processing LSI 100, the analog sensor output 5e (5f) thus representing the white reference signal is converted into a digital reference signal by the interior circuits such as the holding circuit 102 (105), the gain control circuit 103 (106), the switch 107, the buffer amplifier 108 and the A/D converter 109. Then, the digital reference signal output from the image processing LSI 100 is supplied to the control unit 15 (see FIG. 1). In the control unit 15 the digital reference signal is provided for a calculation of a gain suitable to achieve an optimum input level of the analog sensor output 5e (5f). That is, the 1 bit enabling signal and the 2 bit signals Sg1 and Sg0 signals applied to the gain controllers 103 and 106 are suitably set in accordance with the calculation in the control unit 15 for properly maintaining the input of the A/D converter 109.

As a result, the dynamic range of the analog sensor output 5e (5f) can be expanded in maintaining the input of the A/D converter 109 at the optimum level. Thus, after the gain of the gain control circuit 103 (106) has been suitably set, the scanning unit 3 starts to scan the document O set on the document holder 2 to be read.

As described above, the input level of the A/D converter 109 is automatically adjusted to the optimum level corresponding to the digital output of the A/D converter 109 itself during the scanning operation of the white reference plate 16.

Figure 11:
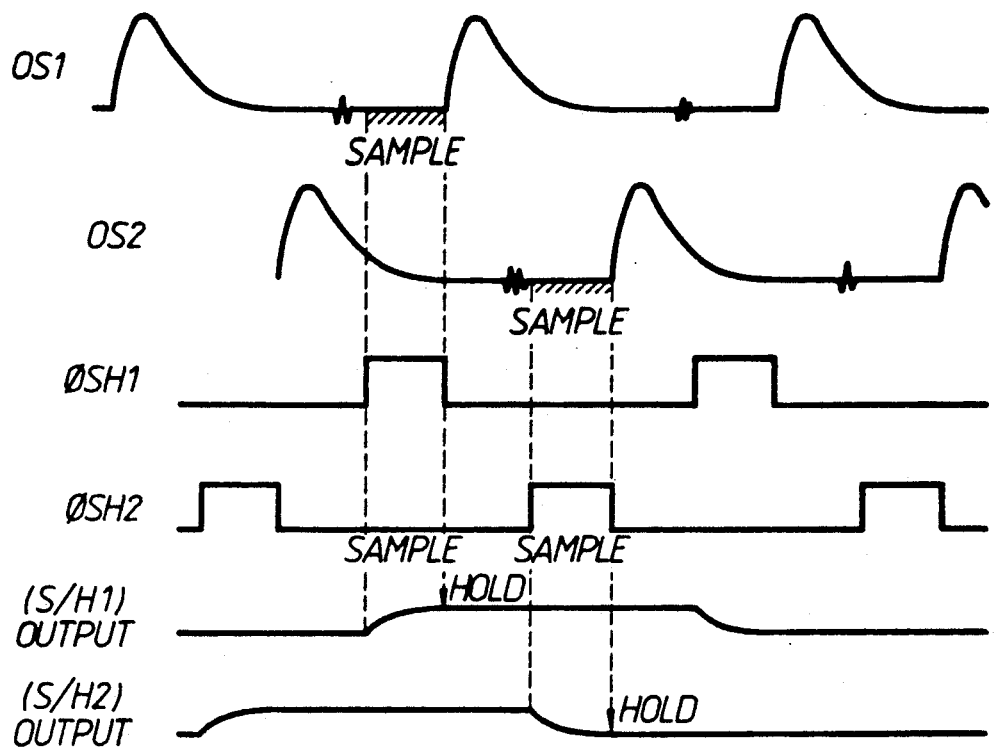
FIG. 11 is a timing chart of signals processed by the opposite phase reading system.

In the image processing LSI 100, if the dual sensor outputs OS1 and OS2 are applied from the CCD line sensor 5 in response to the opposite phase reading system, as shown in the timing chart of FIG. 11, the sampling pulse φsh1 is applied to the sample-and-hold circuit 102 through the sampling signal selector 110 and the lead 102a. As a result, the sensor output OS1 from the CCD line sensor 5 is carried out a sample-and-hold processing by the sampling pulse φsh1 in the sample-and-hold circuit 102. The sample-and-hold output SH1 from the sample-and-hold circuit 102 is applied to the gain controller 103. On the other hand, the sampling pulse φsh2 is applied to the sample-and-hold circuit 105 through the sampling signal selector 110 and the lead 105a. As a result, the sensor output OS2 from the CCD line sensor 5 is processed by the sampling pulse φsh2 in the sample-and-hold circuit 105. The sample-and-hold output SH2 from the sample-and-hold circuit 102 is applied to the gain controller 106.

Figure 12:
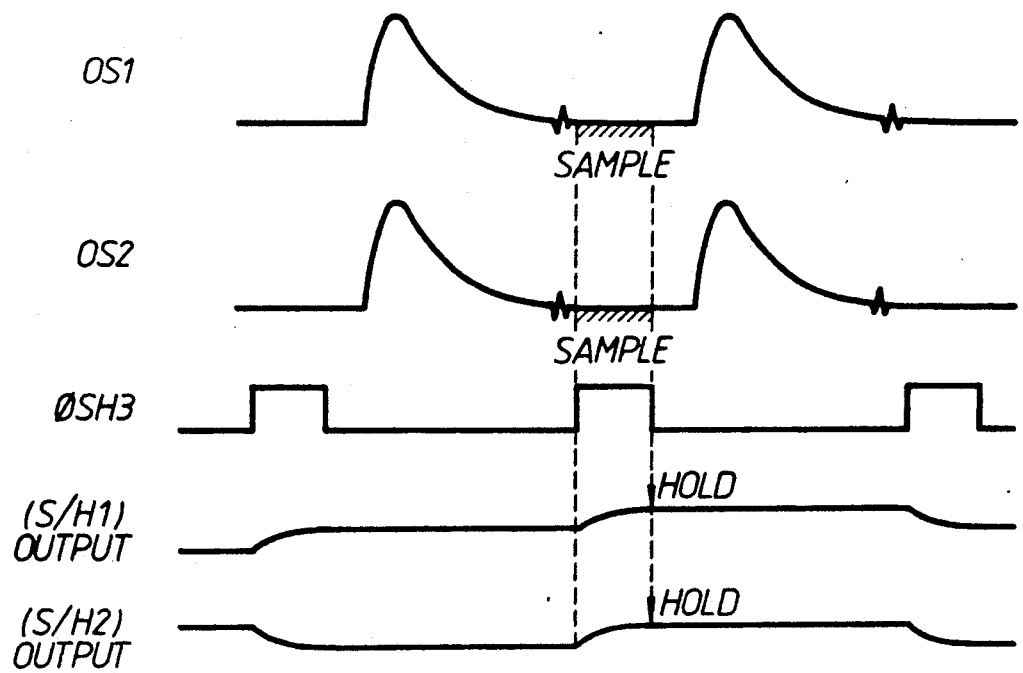
FIG. 12 is a timing chart of signals processed by the in-phase reading system.

If the dual sensor outputs OS1 and OS2 are applied from the CCD line sensor 5 in response to the in-phase reading system, as shown in the timing chart of FIG. 12, the sampling pulse φsh3 is applied to both of the sample-and-hold circuits 102 and 105 together through the sampling signal selector 110 and the leads 102a and 105a. Then, the sample-and-hold outputs SH1 and SH2 are sent to the gain control circuits 103 and 106, respectively.

Furthermore, in this image processing LSI 100, prior to execution of the image processing, the mode switching signal φs is applied to the image processing LSI 100 through the terminal 111, as described above. The mode switching signal φs is changed in accordance with whether the CCD line sensor 5 is adapted for the opposite phase reading system or the in-phase reading system. For example, the mode switching signal φs is set to "0" in case of the opposite phase reading system, while it is set to "1" in case of the in-phase reading system.

That is, in the process by the opposite phase reading system the sampling signal selector 110 is set to the condition for separately passing the sampling pulse φsh1 and φsh2 to the sample-and-hold circuits 102 and 105 by the mode switching signal φs of the "0" state. In the in-phase reading system the sampling signal selector 110 is set to the condition for passing the sampling pulse φsh3 to both the sample-and-hold circuits 102 and 105 by the mode switching signal φs of the "1" state. Thus, the sample-and-hold circuits 102 and 105 can effectively correspond to both the signal processings by both the opposite phase reading system and the in-phase reading systems.

As a result, the image processing LSI 100 according to the present invention is able to carry out the sample-and-hold operation for the sensor output signals read from the CCD line sensor 5 by both the opposite phase reading system and the in-phase reading system with a simple construction. The image processing LSI 100 according to the present invention also is able to maintain its processing operation in the optimum condition.

Further, in the embodiment as described above, the mode switching signal φs is generated by control unit 15 which is designed to serve for controlling the scanner unit 3 etc., as well as the image processing LSI 100. This mode switching signal may be generated by another CPU adapted for the exclusive use to the image processing LSI 100.

As described above, the present invention can provide an extremely preferable image reading apparatus which is able to process signals read from the photoelectric transducer in either of the opposite phase reading system or the in-phase reading system.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. An integrated circuit device for processing an analog image signal supplied from a CCD sensor having two horizontal transfer registers and a photodiode array between and coupled to the horizontal transfer registers, the horizontal transfer registers transferring respective first and second photosignals, the CCD sensor having a first reading system which generates the analog image signal by combining first and second photosignals with respectively opposite phases and a second reading system which generates the analog image signal by combining first and second photosignals respectively in-phase, the integrated circuit device comprising:

means for processing the analog image signal supplied from the CCD sensor; and means for generating a selecting signal in response to an input to represent the use of the first reading system or the second reading system to the processing means and to enable processing respectively of the analog image signal supplied from the CCD sensor using the first reading system or the analog image signal supplied from the CCD sensor using the second reading system.

2. An integrated circuit device as claimed in claim 1, wherein the processing means includes sample-and-hold means for executing a sample-and-hold on the analog image signal generated from the first reading system or the second reading system, gain control means for adjusting the gain of an output from the sample-and-hold means, amplifying means for amplifying an output from the gain control means, and analog-to-digital converting means for executing an analog-to-digital conversion on an output from the amplifying means.

3. An integrated circuit device as claimed in claim 2, wherein the selecting means includes means for applying a timing pulse signal responsive to the first reading system or the second reading system to the sample-and-hold means for executing sample-and-hold operations on the analog image signal in the sample-and-hold means.

4. An integrated circuit device as claimed in claim 1, wherein:

the integrated circuit device further comprises a system control means for generating a mode selecting signal to selectively operate the first reading system or the second reading system and selectively generating a pair of timing pulse signals corresponding to the first reading system or a single timing pulse signal corresponding to the second reading system;

the processing means includes a pair of sample-and-hold means for executing sample-and-hold operations on the analog image signal generated from the first reading system or the second reading system, a pair of gain control means for adjusting the gains of outputs from the pair of sample-and-hold means, amplifying means for amplifying outputs from the pair of gain control means and analog-to-digital converting means for executing an analog-to-digital conversion on an output from the amplifying means; and the selecting means further includes respective means for receiving the mode selecting signal, the pair of timing pulse signals and the single timing pulse signal from the system control means, so that the selecting means separately passes the pair of timing pulse signals to the pair of sample-and-hold means or commonly passes the single timing pulse signal to the pair of sample-and-hold means in response to the mode selecting signal.

5. An image reading apparatus comprising:

means for scanning an original having an image information so as to read the image information from the original;

sensing means for producing an analog reading signal corresponding to the image information read by the scanning means, the sensing means having two horizontal transfer registers and a photodiode array between and coupled to the horizontal transfer registers, the horizontal transfer registers transferring respective first and second photosignals, the sensing means having a first reading system which generates the analog reading signal by combining the first and second photosignals read with respectively opposite phases and a second reading system which generates the analog reading signal by combining first and second photosignals read respectively in-phase;

means for processing the reading signal produced by the reading means; and means for generating a selecting signal in response to an input to represent the use of the first reading system or the second reading system to the processing means and to enable processing respectively of the analog reading signal supplied from the first reading system or the analog reading signal supplied from the second reading system.

6. An image reading apparatus as claimed in claim 5, wherein the processing means includes sample-and-hold means for executing a sample-and-hold on the analog reading signal generated from the first reading system or the second reading system, gain control means for adjusting the gain of an output from the sample-and-hold means, amplifying means for amplifying an output from the gain control means, and analog-to-digital converting means for executing an analog-to-digital conversion on an output from the amplifying means.

7. An image reading apparatus as claimed in claim 6, wherein the selecting means includes means for applying a timing pulse signal responsive to the first reading system or the second reading system to the sample-and-hold means for executing sample-and-hold operations on the analog reading signal in the sample-and-hold means.

8. An image reading apparatus as claimed in claim 5, wherein:

the image reading apparatus further comprises a system control means for generating a mode selecting signal to selectively operate the first reading system or the second reading system and selectively generating a pair of timing pulse signals corresponding to the first reading system or a single timing pulse signal corresponding to the second reading system;

the processing means includes a pair of sample-and-hold means for executing sample-and-hold operations on the analog reading signal generated from the first reading system or the second reading system, a pair of gain control means for adjusting the gain of outputs from the pair of sample-and-hold means, amplifying means for amplifying outputs from the pair of gain control means and analog-to-digital converting means for executing an analog-to-digital conversion on an output from the amplifying means; and the selecting means further includes respective means for receiving the mode selecting signal, the pair of timing pulse signals and the single timing pulse signal from the system control means, so that the selecting means separately passes the pair of timing pulse signals to the pair of sample-and-hold means or commonly passes the single timing pulse to the pair of sample-and-hold means in response to the mode selecting signal.

* * * * *

UNITED STATES PATENT AND TRADEMARK OFFICE
CERTIFICATE OF CORRECTION

PATENT NO. : 5,251,047  
DATED : October 05, 1993  
INVENTOR(S) : Shuji Kizu et al.

It is certified that error appears in the above-indentified patent and that said Letters Patent is hereby corrected as shown below:

Claim 8, column 12, line 4, after "pulse" insert --signal--.

Signed and Sealed this

Twenty-third Day of August, 1994

Attest:

BRUCE LEHMAN

*Attesting Officer*  *Commissioner of Patents and Trademarks*